(12) United States Patent
Brassac et al.

(10) Patent No.: US 9,934,183 B2
(45) Date of Patent: Apr. 3, 2018

(54) SERVER COMPRISING A PLURALITY OF MODULES

(71) Applicant: BULL SAS, Les Clayes-Sous-Bois (FR)

(72) Inventors: Claude Brassac, Saint Germain en Laye (FR); Georges Lecourtier, Versailles (FR)

(73) Assignee: BULL SAS, Les Clayes-Sous-Bois (FR)

(*) Notice: Subject to any disclaimer, the term of this patent is extended or adjusted under 35 U.S.C. 154(b) by 236 days.

(21) Appl. No.: 14/824,223

(22) Filed: Aug. 12, 2015

(65) Prior Publication Data
US 2016/0062936 A1  Mar. 3, 2016

(30) Foreign Application Priority Data

Aug. 26, 2014 (FR) ...................... 14 01900

(51) Int. Cl.
| *G06F 13/40* | (2006.01) |
| *G06F 13/42* | (2006.01) |
| *G06F 15/16* | (2006.01) |
| *G06F 11/20* | (2006.01) |
| *G06F 1/10* | (2006.01) |
| *G06F 1/14* | (2006.01) |
| *G06F 1/26* | (2006.01) |

(52) U.S. Cl.
CPC ............ *G06F 13/4027* (2013.01); *G06F 1/10* (2013.01); *G06F 1/14* (2013.01); *G06F 11/2015* (2013.01); *G06F 13/4282* (2013.01); *G06F 15/161* (2013.01); *G06F 1/26* (2013.01)

(58) Field of Classification Search
CPC .... G06F 1/26; G06F 13/4027; G06F 13/4282; G06F 15/161
USPC ...................... 710/105, 107, 316, 15, 30, 33
See application file for complete search history.

(56) References Cited

U.S. PATENT DOCUMENTS

| 8,189,612 | B2* | 5/2012 | Lemaire | ............. G06F 15/7867 370/463 |
| 8,924,899 | B2* | 12/2014 | Seidner | ................ G06F 17/505 716/102 |
| 2008/0086580 | A1* | 4/2008 | Zhang | .................... H04L 12/40 710/107 |
| 2008/0258556 | A1* | 10/2008 | Ewing | ....................... H02J 9/06 307/23 |
| 2008/0313312 | A1* | 12/2008 | Flynn | ...................... G06F 1/183 709/221 |
| 2010/0017873 | A1* | 1/2010 | Sievert | ................. G06F 9/5077 726/17 |
| 2011/0016340 | A1* | 1/2011 | Sun | .......................... G06F 1/30 713/340 |

(Continued)

*Primary Examiner* — Farley Abad
*Assistant Examiner* — Henry W Yu
(74) *Attorney, Agent, or Firm* — Sughrue Mion, PLLC

(57) ABSTRACT

A server (100) having a plurality of modules (1-8), each module including a communication element (16, 26), a plurality of processors (CPU) (10, 11, 20, 21), a system on a chip (SOC) (12, 22) executing firmware, and a network of programmable ports (FPGA) (13, 23). The modules interconnected by an interconnection (27) between each communication element, an interconnection (28) between each system on a chip (SOC). The executed firmware produces two software components: a satellite management controller (SMC) component of the system (15, 25) and a baseboard management controller (BMC) component (14, 24).

10 Claims, 2 Drawing Sheets

(56) References Cited

U.S. PATENT DOCUMENTS

| | | | |
|---|---|---|---|
| 2013/0080754 A1* | 3/2013 | Ganesh | G06F 9/4403 713/2 |
| 2013/0318365 A1* | 11/2013 | Rumney | G06F 1/20 713/300 |
| 2014/0124168 A1* | 5/2014 | Dean | G06F 1/20 165/67 |
| 2014/0195704 A1* | 7/2014 | Bhatia | G06F 13/42 710/105 |
| 2014/0330978 A1* | 11/2014 | Venkatesh | H04L 29/08567 709/226 |

* cited by examiner

SERVER COMPRISING A PLURALITY OF MODULES

CROSS REFERENCE TO RELATED APPLICATIONS

This application is claiming priority based on French Patent Application No. 14 01900, filed Aug. 26, 2014, the contents of all of which is incorporated herein by reference in its entirety.

The present invention concerns the domain of information and/or communication processing systems. More particularly, the invention proposes the creation of a multi-module server and the implementation of the functions associated therewith.

Among computer server architectures, multiprocessor network servers, called SMP (symmetric multiprocessor), are typically produced by a plurality of integrated circuits, commonly called sockets. For these servers, the sockets constitute the processors of the system, these integrated circuits being connected by a very high-throughput, very low-latency interconnection bus, allowing a shared memory. Hereinafter, "interconnection" will be understood as a physical and logical link connecting two connection interfaces.

Generally, for reasons of electrical performance, each socket directly supports one part of the memory components of the SMP server. All of this memory is then made coherent by memory controllers, making it possible to automatically guarantee that any data modified by one of the processors is then visible by all of the others.

For physical reasons, an SMP server having a large number of sockets must then be divided into several subsystems. These subsystems can, by way of example, be produced by daughter cards connected to a motherboard, blades connected to a backplane distributing the power and signals from the buses, or self-powered modules with voltage and current from the mains. This is referred to as a multi-module SMP server.

Regardless of its architecture, an SMP server needs hardware administration tools based on norms and/or standards.

Thus, the intelligent platform management interface (IPMI) offers a set of interface specifications for managing, i.e., supervising and controlling, the physical status of certain components or electronic hardware present in computer equipment. For example, the IPMI standard makes it possible to monitor in a server the regulation of temperature, voltage, power supply of microprocessors, their proper powering up, the humidity level of the components, or the speed of the cooling fans. All functions of the IPMI can generally be activated by a basic input/output system called BIOS (basic input/output system) or by management software furnished by the manufacturer of the equipment. Thus, if needed, for example when an alert associated with an event is issued (e.g., overheating) of a piece of equipment, the network administrator can, via an appropriate graphic interface and from the same location (e.g., on a local or remote machine), electrically turn off the equipment concerned, restart it, reinitialize its parameters if necessary, or turn on an alternate piece of equipment.

For the hardware, the supervision of the physical status of the components or electronic hardware is currently provided by a baseboard management controller (BMC), implemented on the motherboard, or on the main card of the hardware to be supervised. For example, for a server, the functions of the BMC are performed by the integration on the server's motherboard of a system on a chip (SOC), on which firmware is executed, implementing the IPMI standard.

However, the various existing implementations only deal with the common issues of a server with a single motherboard. In the case of a server comprising a plurality of modules connected by logic data buses to an interconnection component, for example connected according to the $I^2C$ (Inter-Integrated Circuit) standard, the use of a BMC controller quickly proves to be limited. The number of sensors increases in proportion to the number of interconnected modules, while the IPMI standard is limited to a predefined number of authorized sensors. Moreover, the increase in the number of modules requires the extension of the logic data buses. Such an extension, for example in the case of $I'I^2C$, is not very reliable, and is lacking in performance and flexibility.

In order to bypass the problems due to the support of the IPMI, one solution consists of using proprietary administration standards. However, such a solution proves to be not very beneficial if one wishes to continue to guarantee both the interoperability and the possibilities of integrating servers with existing data management systems, because these systems utilize standard management interfaces.

It is therefore advantageous to continue to provide support for the IPMI standard, and more generally standard management interfaces, for multi-module computer equipment, in order to guarantee inter-hardware compatibility.

An object of the present invention is to remedy the aforementioned disadvantages.

A first objective is to propose a multi-module server architecture.

A second objective is to propose a multi-module server with a number of extendable modules, enabling software compatibility with standard management interfaces.

A third objective is to propose firmware compatible with standard management interfaces, such as the IPMI standard, and enabling the management of any module forming part of a multi-module server.

To that end, a server is proposed comprising a plurality of modules, each module comprising
- a communication element capable of ensuring the coherence of a memory shared among the modules;
- a plurality of processors (CPU) connected to each other and connected to the communication element;
- a system on a chip (SOC) connected to the plurality of processors (CPU) and to the communication element, the SOC executing firmware;
- a network of programmable ports (FPGA) connected to the system on a chip (SOC), to the communication element and to the plurality of processors (CPU);

the modules being interconnected by
- an interconnection between each communication element via an XQPI network;
- an interconnection between each system on a chip (SOC) via an Ethernet protocol private network, encapsulating a communication protocol in accordance with the IPMB standard;

the firmware executed on each system on a chip (SOC) of each module producing two software components, namely:
- a satellite management controller (SMC) component of the system capable of measuring the physical parameters of its module and managing the local functions of said module;
- a baseboard management controller (BMC) component capable of supervising all of the SMCs of all of the modules, providing central management of all functions of the server and exchanging data with each of the BMC components via the interconnection between each system on a chip (SOC).

Advantageously, in this server, the interconnection of the communication elements and interconnection of the SOCs are accomplished by means of an interconnection unit, the interconnection unit comprising a network of programmable ports (FPGA).

Advantageously, in said server, the interconnection unit is electrically powered by the modules, each module comprising at least two power supply units (PSU), the power supply units (PSU) being dimensioned with a redundancy of 2N.

Advantageously, in said server, one of the functions managed by each BMC component is a function of enabling the instantiation of the modules, said function being performed in the following manner:
- the sending of an identifier (ID) request by the FPGA of each module to the interconnection unit by means of the system on a chip (SOC);
- the sending by the FPGA of the interconnection unit of a unique identifier (ID) to the FPGA in response to the identifier request;
- the determination by the BMC component of the address of its module and of the addresses of the modules to which it is interconnected, the determination of said addresses being performed based on the identifier (ID) received by the FPGA.

Advantageously, in said server, the identifier (ID) sent by the FPGA of the interconnection unit is determined based on each physical connection location of each of the modules to the interconnection module.

Advantageously, in said server, each of the modules comprises
- a clock signal generator capable of synchronizing the processors (CPU) of its module;
- its FPGA programmed to partition and group the modules into subsets based on common characteristics.

Advantageously, in said server, each BMC component is programmed to:
- identify in a set or subset of modules whether it belongs to a master or slave module, based on identification information from each of the modules of said set or subset;
- if it belongs to a master module, configure its FPGA in such a way that the FPGA distributes the clock signal from the master module to the slave modules of the same set or subset;
- if it belongs to a slave module, configure its FPGA in such a way that the FPGA deactivates the clock signal from the slave module.

Advantageously, in said server, each processor (CPU) of each module comprises time stamp counters (TSC) capable of synchronizing tasks involving a plurality of threads, the synchronization of all of the time stamp counters (TSC) of said processors (CPU) in a set or subset of modules being accomplished by:
- the sending of a notification, by each BMC component of each slave module of said set or subset, to the BMC of the master module when the slave module leaves an initialization or reinitialization phase;
- a notification to the BMC of the master module when the master module leaves an initialization or reinitialization phase;
- the sending by the BMC of the master module, when all of the master and slave modules have left an initialization or reinitialization phase, of a synchronization signal capable of reinitializing all of the time stamp counters (TSC) of the processors (CPU) for all the modules of the same set or subset.

Advantageously, in said server, each FPGA of each module comprises time stamp counters (TSC) capable, whenever an error occurs in its module, of recording information related to the error, comprising at least the time stamp of the error, the synchronization of all of the time stamp counters (TSC) of each FPGA in a module set or subset being accomplished by:
- the sending of a notification, by each BMC component of each slave module of said set or subset, to the BMC of the master module when the slave module leaves an initialization or reinitialization phase;
- a notification to the BMC of the master module when the master module leaves an initialization or reinitialization phase;
- the sending by the BMC of the master module, when all of the master and slave modules have left an initialization or reinitialization phase, of a synchronization signal capable of reinitializing all of the time stamp counters (TSC) of the FPGAs for all modules of the same set or subset.

Advantageously, in said server, the identification of an error in a set or subset of modules is performed by a step of comparison between the error information recorded by all of the time stamp counters (TSC) of the FPGAs of said set or subset, the BMCs being capable of exchanging and sharing the error information in the same set or subset of modules.

Other objects and advantages of the invention will be seen from the description of embodiments, provided hereinafter with reference to the appended drawings in which.

Figure 1:
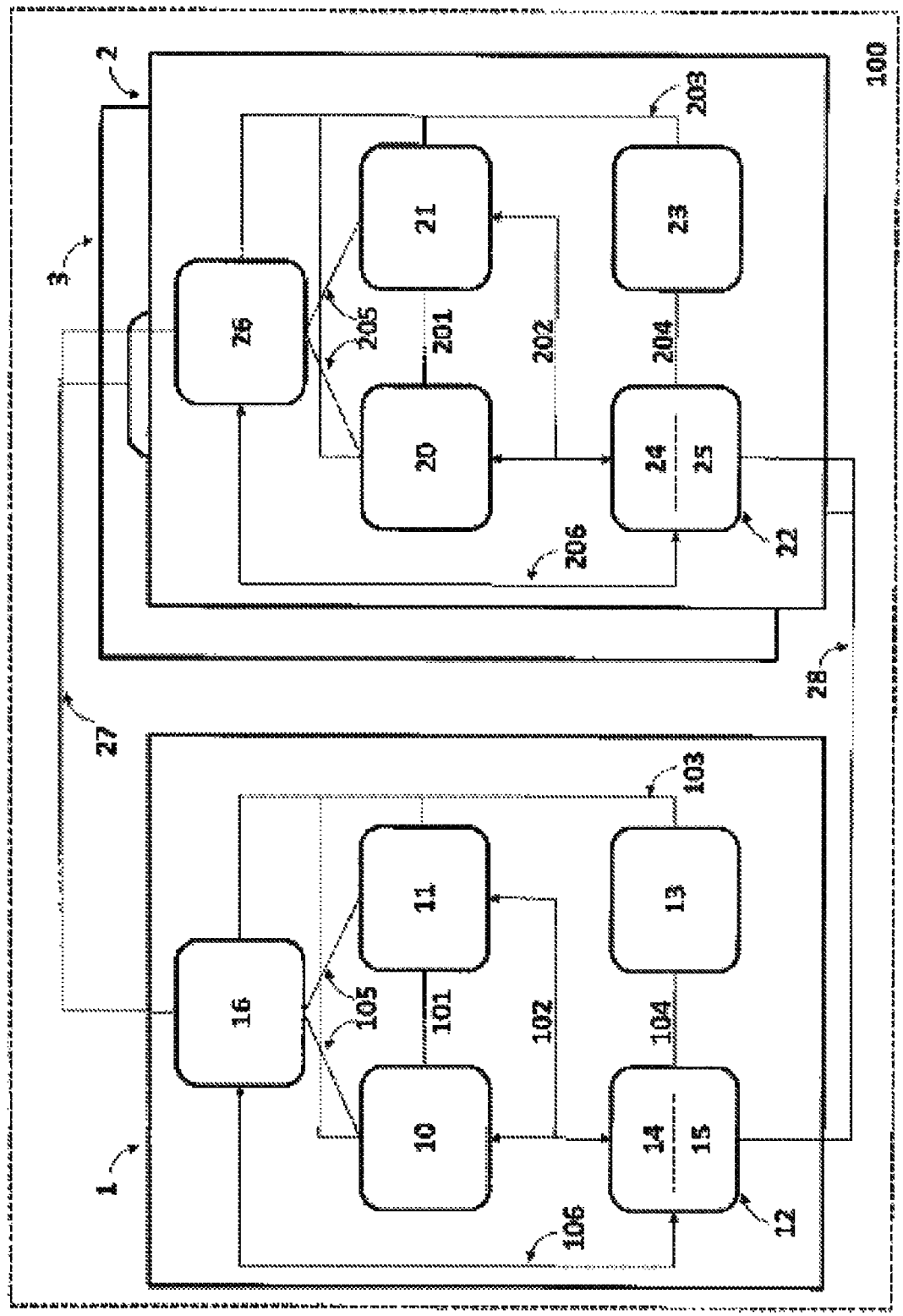
FIG. 1 is a representation of a server comprising a plurality of modules according to one embodiment.

Represented in FIG. 1 is an embodiment of a server 100 comprising a plurality of modules 1, 2, 3, three in this example, such as motherboards or printed circuit cards. Nevertheless, any other number of modules can be integrated into the server 100, for example eight.

Advantageously, each of the modules 1, 2, 3 is identical and comprises the following elements:
- one or more processors (CPU) (Central Processing Unit) 10, 11, 20, 21. In the example illustrated, each module 1, 2 is bi-socket, that is, it supports respectively two processors (CPU) 10, 11, 20, 21. Advantageously, the processors (CPU) 10, 11, 20, 21 of the same module 1, 2, 3 are interconnected to each other via a QPI (QuickPath Interconnect) link 101, 201;
- a system on a chip (SOC) 12, 22, for example a microcontroller, executing management firmware. In one embodiment, the firmware comprises two processes executed in parallel, and capable of exchanging information, each logically performing respectively the function of a component: a BMC component 14, 24 and a satellite management controller component of the system, hereinafter designated as the SMC component 15, 25. Advantageously, the functions of the BMC components 14, 24 and SMC components 15, 25 are defined in the IPMI standard. In one embodiment, the SOC 12, 22 is capable of exchanging data with the processors (CPU) 10, 11, 20, 21 via a platform environment control interface (PECI) 102, 202;
- a programmable ports network, currently designated by the name FPGA (Field-Programmable Gate Array) 13, 23, allowing in particular the transmission of signals to any component with which it is interfaced, for example clock, error and/or reinitialization signals. Advantageously the FPGA 13, 23 comprises a link 103, 203 capable of exchanging data with the processors (CPU) 10, 11, 20, 21 and a link 104, 204 capable of exchanging data with the SOC 12, 22;

memories such as cache associated with the processors (CPU) 10, 11, 20, 21;

a communication element 16, 26 comprising a link 105, 205 with each of the processors (CPU) 10, 11, 20, 21, capable of providing coherence of a "global" memory shared among the processors (CPU) 10, 11, 20, 21 of each module 1, 2, 3. In one embodiment, the communication element 16, 26 is a BCS (Bull Coherent Switch) component, which is a commercially available solution proposed by the applicant, or any subsequent version thereof such as the BCS2 (Bull Coherent Switch 2). The communication element 16, 26 is further capable of exchanging data with the FPGA 13, 23 via the link 103, and with the SOC 12, 22 via a bus 106, 206 according to the I²C standard.

Advantageously, the modules 1, 2, 3 of the server 100 are interconnected by high-speed links, achieving the following interconnections:

an interconnection 27 of the communication elements 16, 26 of the modules 1, 2, 3 via an XQPI (eXtended QuickPath Interconnect) network, which is a commercially available interconnection solution proposed by the applicant. Advantageously, the interconnection 27 enables the communication elements 16, 26 such as BCS2 pertaining to the modules 1, 2, 3 to exchange information, thus ensuring memory coherence of all of the modules 1, 2, 3. The interconnection 27 via the XQPI network also allows synchronization signals to be carried between each module 1, 2, 3, such as clock signals, the synchronization of which is managed by the FPGAs 13, 23;

an interconnection 28 of the SOCs 12, 22 of the modules 1, 2, 3 via a private Ethernet protocol network, encapsulating a communication protocol in accordance with the IPMB (Intelligent Platform Management Bus) standard. In the prior art, the IPMB standard is used on communication buses, in accordance with the I²C standard. The utilization of the IPMB standard over a local area network (LAN), called "IPMB over LAN," as proposed here has the advantages of improving performance, reliability and flexibility of data transmissions between each of the SOCs 12, 22 of the modules 1, 2, 3 of the server 100.

It should be noted that each interconnection link 28 includes a bidirectional Ethernet link and a set of side-band signals, including the SPI (Serial Peripheral Interface) signals.

In one embodiment, the interconnection 27 of the communication elements 16, 26 and the interconnection 28 of the SOCs 12, 22 are accomplished via an interconnection unit 30, illustrated in FIG. 2 and described hereinafter. By way of example, the interconnection unit 30 is a backplane, comprising a network switch.

Advantageously, each BMC component 14, 24 implemented on each SOC 12, 22 can be used as data exchange interface, particularly between each BMC component 14, 24 of each module 1, 2, 3, as well as with external computer hardware management applications, such as any standard management interface. For example, an external computer hardware management application utilized for the server 100 is in the form of a graphic interface offered to an administrator, allowing him to supervise the physical parameters of a module 1, 2, 3 (e.g., measured temperatures, measured voltages, detection of the presence/absence of a specific interconnection cable);

to communicate to the BMC component an appropriate action to undertake if an anomaly is detected (e.g., powering up/powering down of a module or restarting a module 1, 2, 3).

To do this, from a logical point of view, the interconnection 28 of each SOC 12, 22 enables the interconnection of each BMC component 14, 24 of each module 1, 2, 3. The BMC components 14, 24 of each of the modules 1, 2, 3 are therefore capable of exchanging information among them, the pooling of their functions and information enabling the server 100, from the point of view of an external hardware management application, to be a single-module server 100. Thus, each BMC component 14, 24 is programmed to manage the high-level functions, i.e., central functions, of the server 100, for example:

managing the powering up of the server 100;

managing one or more SMC components 15, 25, for example the supervision of their statuses, reception of measurements or any other data from the SMC components 15, 25, or the transmission of control messages (control) to the SMC components 15, 25;

a partitioning of clock signals based on existing partitions between different modules 1, 2, 3. Hereinafter, the term partition in a multi-module system designates a subset of modules 1, 2, 3 capable of functioning independently from other modules 1, 2, 3 of that same system. For example, a partition is a subset of modules 1, 2, 3 executing a same operating system (OS), or executing a same set of operating systems (OS) if the modules comprise hypervisor layers. Advantageously, any method of partitioning capable of grouping one or more sets of modules 1, 2, 3 sharing common characteristics, for example executing a same operating system (OS), can be used;

the synchronization and broadcast, i.e., the routing, of synchronization signals via the interconnection 27 through the XQPI network, based on existing partitions between different modules 1, 2, 3.

Each SMC component 15, 25 enables management of low-level functions, i.e., local functions, of the module 1, 2, 3 on which it is implemented, and communicates to the BMC component 14, 24 of the same SOC 12, 22 the data it supervises, for example measurements. By way of example, when the server 100 is powered up, each SMC component 15, 25 powers up its own module 1, 2, 3 according to a preconfigured process (e.g., sequencing, programming of its BCS2, voltage control) and reports to the BMC component 14, 24 of the same SOC 12, 22 the status of the powering up of its module 1, 2, 3. Moreover, each SMC component 15, 25 supervises the status of its own hardware, for example, it measures a specific number of parameters of its own module 1, 2, 3 (e.g., temperature, voltages) and transmits this information to the BMC component 14, 24 of the same SOC 12, 22. The BMC component 14, 24 is then capable of making a decision based on the parameters that the SMC component 15, 25 communicates to it, for example to restart a particular module 1, 2, 3 in the event an anomaly is detected. Thus, the hardware components of each module 1, 2, 3 are managed by an SMC component 15, 25 local to the module 1, 2, 3, independently from the other modules 1, 2,

3, while each BMC component 15, 25 can manage a variable number of modules 1, 2, 3 via the interconnection 28 through the IPMB over LAN. Advantageously, such architecture is very flexible because it is independent of the number of modules 1, 2, 3.

According to one embodiment, the physical topology of the Ethernet and SPI links is a star type. The clock side-band signals CATERR or TSC_SYNC are in a physical mesh topology (all-to-all). According to various other embodiments, other topologies can be envisaged, for example Clos or multidimensional tori.

Advantageously, the interconnection unit 30 is produced based on the topology chosen. For example, in the case of a server 100 with N modules, for an all-to-all topology, each interconnection port of a module 1, 2, 3 must support N−1 high-speed links going to each of its neighbors. If, in a configuration of eight modules, where N=8, each module 1, 2, 3 comprises seven links to eight unidirectional channels, the interconnection unit 30 is then created so as to support 8*7*8, or 448 unidirectional high-speed channels.

Moreover, in order to improve the resiliency of the interconnection unit 30 in the event of breakdown, it is possible to create the switch of said unit via a plurality of switches. For example, for a server 100 with eight modules, in order to interconnect the SOCs 12, 22 of the modules 1, 2, 3, the switch of the interconnection unit 30 is an eight-port Ethernet switch. Such a switch can then be created via two five-port switches in the following way: if each of the switches comprises four downlink ports and one uplink port, then the uplink ports are connected via a printed circuit track. Thus, the SOCs 12, 22 of the modules 1, 2, 3 can only lose all of their means of dialogue in the event of breakdown of all of the switches, a risk that decreases in proportion to the number of switches employed to create the switch of the interconnection unit 30.

For the same reasons of resiliency, all of the hardware components that furnish the physical links between the modules are passive components. Advantageously, said passive components are chosen so as to have a mean time between failures (MTBF) that is several orders of magnitude greater than the MTBF of the modules 1, 2, 3. Thus, the number of breakdowns created by these components is negligible when evaluating the availability of the server 100.

Still with a view to ensuring good resiliency with respect to power supply breakdowns, each module 1, 2, 3 comprises at least two power supply units (PSU), which, by way of example, can be in the form of AC/DC (alternating current/direct current) converters, delivering an input power for each module 1, 2, 3, for example less than 12 V. Furthermore, each of the PSUs can be dimensioned with a redundancy of 2N, i.e., comprise a doubling of their technical components (e.g., electronic components), and can be connected to two independent alternating current (AC) systems, making it possible to guarantee the functioning of the server 100 if one of the systems fails. The interconnection unit 30 is electrically powered by the modules 1, 2, 3, each sending through Ethernet links of the interconnection 28 a current at a predefined voltage, for example 12 V. Said currents are then added together by an appropriate electronic device that is part of the interconnection unit 30, for example diode switching. In the prior art, the Power-over-Ethernet (PoE) standard describes the electrical power supply of devices interfaced with a switch via an Ethernet link, due to the power supply of the switch. Thus, an electrical failure of the switch prevents any power from supplying the devices. In contrast to this standard, the embodiment described above makes it possible to reduce the impact of a power failure on the server 100, said impacts being limited to the perimeter of a possible breakdown of one module 1, 2, 3, the probability of breakdown thus being reduced due to the redundancy of the power supply units. Thus, all of the Ethernet links made via the interconnection 27 of the modules 1, 2, 3 cooperate so as to furnish redundant electrical power to the switch of the interconnection unit 30, only said switch comprising active components. The switch of the interconnection unit 30 is thus capable of functioning in spite of a possible breakdown of one or more modules 1, 2, 3. Advantageously, the power dissipated by said switch is very low (on the order of 2 to 3 Watts) and the number of components present in this switch makes it possible to provide an MTBF on the order of several millions of hours. Moreover, all of the BMC components 14, 24 of the SOCs 12, 22 are configured to supervise the operation of said switch and to manage any malfunction. Advantageously, the embodiments described above enable any module 1, 2, 3 to resist a breakdown of the switch of the interconnection unit 30, in spite of its central position. If a failure is detected on the switch, a hot swap of said module therefore does not interrupt the operation of the multi-module server 100.

Figure 2:
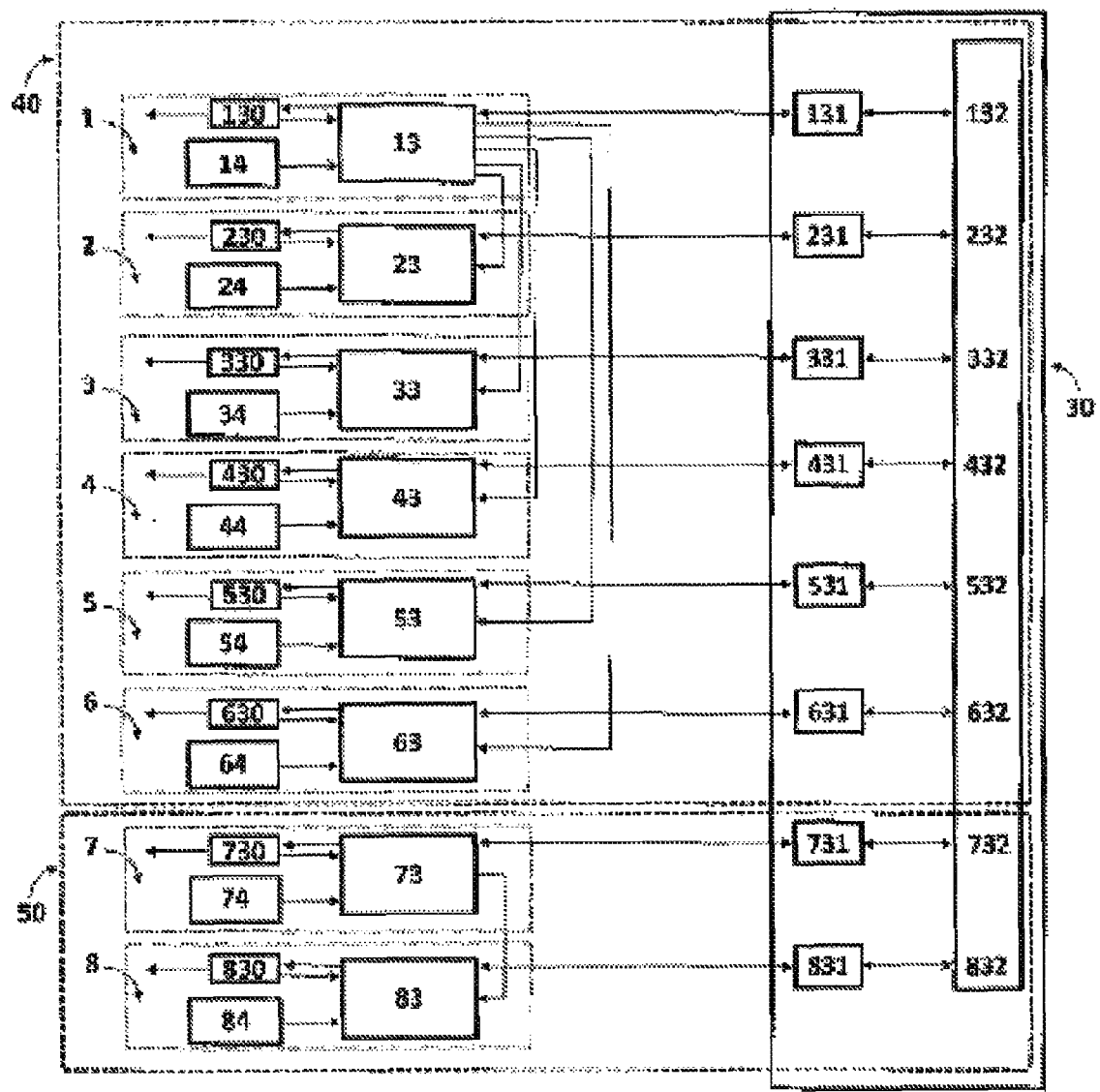
FIG. 2 is a representation of the interconnection of eight modules with an interconnection unit in a server according to one embodiment.

FIG. 2 illustrates the interconnection of eight modules 1, 2, 3, 4, 5, 6, 7, 8 with an interconnection unit 30, according to one embodiment, and in accordance with the previously described characteristics. In this figure, each module 1, 2, 3, 4, 5, 6, 7, 8 comprises respectively the previously mentioned elements, in particular:

- an FPGA 13, 23, 33, 43, 53, 63, 73, 83 capable of managing a specific clock signal 130, 230, 330, 430, 530, 630, 730, 830. The management of these signals is detailed hereinafter;
- a BMC component 14, 24, 34, 44, 54, 64, 74, 84 capable of managing high-level functions such as instantiation, powering up, restart and instantiation of the modules 1, 2, 3, 4, 5, 6, 7, 8.

The communication elements 16, 26, the processors (CPU) 10, 11, 20, 21, the SOCs 12, 22 and interconnections 27, 28 are not represented in this figure in order to simplify the reading thereof, but they remain present. In particular, each module 1, 2, 3, 4, 5, 6, 7, 8 is respectively interconnected by its communication elements 16, 26 and its SOC 12, 22 to the other modules 1, 2, 3, 4, 5, 6, 7, 8, respectively via the interconnections 27, 28 and by means of the interconnection unit 30.

In one embodiment, the connection of each module 1, 2, 3, 4, 5, 6, 7, 8 to the interconnection unit 30 is achieved at said unit respectively via a synchronous data bus SPI (Serial Peripheral Interface) 131, 231, 331, 431, 531, 631, 731, 831. The data exchanges between each module 1, 2, 3, 4, 5, 6, 7, 8 and the interconnection unit 30 via the synchronous data buses SPI 131, 231, 331, 431, 531, 631, 731, 831 are represented in this figure by double arrows between said elements. Moreover, each of the synchronous data buses SPI 131, 231, 331, 431, 531, 631, 731, 831 is respectively interfaced with a register 132, 232, 332, 432, 532, 632, 732, 832 of an accessory device of the interconnection unit 30, here an FPGA. Advantageously, the FPGA of the interconnection unit 30 will make it possible to allocate to each SOC 12, 22 of each module 1, 2, 3, 4, 5, 6, 7, 8 an identifier during an initialization phase. The exchanges of information between the synchronous data buses SPI 131, 231, 331, 431, 531, 631, 731, 831 and the registers 132, 232, 332, 432, 532, 632, 732, 832 are symbolized here by double arrows between said elements. An initialization phase of the modules 1, 2, 3, 4, 5, 6, 7, 8, by way of example, can occur during a powering up, a restart of the server 100 or during the initialization of an SOC 12, 22 by a BMC component 14, 24, 34, 44, 54, 64, 74, 84.

As explained previously, an interconnection 28 of each SOC 12, 22 of each module 1, 2, 3, 4, 5, 6, 7, 8 is produced via the communication unit 30 through an Ethernet protocol private network, encapsulating a communication protocol in accordance with the IPMB standard. Therefore, during an initialization phase, each SOC 12, 22 must be able to start its IP (Internet Protocol) connection via an address different from that of its neighbors. To do this, according to various embodiments, each FPGA 13, 23, 33, 43, 53, 63, 73, 83 sends by means of the SOC 12, 22 with which it is interfaced, via the interconnection 28, an identifier request to the interconnection unit 30. Each request is received by the communication unit 30, at the synchronous data bus SPI 131, 231, 331, 431, 531, 631, 731, 831, said SPI transmitting each request to the register 132, 232, 332, 432, 532, 632, 732, 832 of the FPGA with which it is interfaced. Advantageously, each request allows a unique and known identifier (ID) to be obtained only from the register 132, 232, 332, 432, 532, 632, 732, 832 of the FPGA. Said identifier (ID) is issued by means of signals from the bus SPI that are physically independent of the Ethernet signals (of course, the side-band signals are not an integral part of the XQPI interface).

In one embodiment, each identifier (ID) relates to a port number, coded for example on three bits, said identifier (ID) being specific to each physical connection location in the interconnection module 30. Advantageously, said identifier (ID) is unique and thus makes it possible to then identify a specific module 1, 2, 3, 4, 5, 6, 7, 8. The communication unit 30 then communicates by its FPGA an identifier (ID) in response to each request received, said response being transmitted by the synchronous data bus SPI 131, 231, 331, 431, 531, 631, 731, 831, then by the SOC 12, 22 to the FPGA 13, 23, 33, 43, 53, 63, 73, 83 of the module 1, 2, 3, 4, 5, 6, 7, 8 that issued the request. The identifier (ID) received by the FPGA 13, 23, 33, 43, 53, 63, 73, 83 is then read by the BMC component 14, 24, 34, 44, 54, 64, 74, 84 of the SOC 12, 22 with which it is interfaced in order to determine an appropriate instantiation, for example the allocation of an IP address to the module 1, 2, 3, 4, 5, 6, 7, 8. The reading of the identifier (ID) by each BMC component 14, 24, 34, 44, 54, 64, 74, 84 in each FPGA 13, 23, 33, 43, 53, 63, 73, 83 is symbolized in this figure by a unilateral arrow between said elements. In one embodiment, each BMC component 14, 24, 34, 44, 54, 64, 74, 84 applies to said identifier (ID) an algorithm for calculating the IP address in order to determine and instantiate dynamically the IP address of its module 1, 2, 3, 4, 5, 6, 7, 8. Furthermore, each FPGA 13, 23, 33, 43, 53, 63, 73, 83, by means of the synchronous data bus SPI 131, 231, 331, 431, 531, 631, 731, 831, is capable of reading the number of modules 1, 2, 3, 4, 5, 6, 7, 8 connected to the interconnection unit. Thus, the BMC component 14, 24, 34, 44, 54, 64, 74, 84 of each module 1, 2, 3, 4, 5, 6, 7, 8 is also capable of deducing the IP address of the neighboring modules 1, 2, 3, 4, 5, 6, 7, 8 by applying the same algorithm for calculating the IP address. All of the IP addresses thus determined can then be stored, for example, by the 13, 23, 33, 43, 53, 63, 73, 83.

In another embodiment, the IP addresses of each module 1, 2, 3, 4, 5, 6, 7, 8 are IPv4-type addresses formed from 32 bits. Moreover, it is assumed that each IP address includes twenty-nine common most significant bits, such a configuration being applicable in a private Ethernet network such as that of the interconnection 28. After recovery of each identifier (ID) by each of the FPGAs 13, 23, 33, 43, 53, 63, 73, 83, each BMC component 14, 24, 34, 44, 54, 64, 74, 84 then completes said IP address by adding to the three remaining least significant bits the three bits of the identifier (ID) that it has read at its FPGA 13, 23, 33, 43, 53, 63, 73, 83. Thus, each BMC component 14, 24, 34, 44, 54, 64, 74, 84 can be viewed as a dynamic configuration or reconfiguration interface (i.e., self-configuration) of the modules 1, 2, 3, 4, 5, 6, 7, 8 enabling their instantiation, i.e., the allocation of an IP address, or more generally an identifier to each of said modules 1, 2, 3, 4, 5, 6, 7, 8.

Each module 1, 2, 3, 4, 5, 6, 7, 8 further comprises a clock generator capable of generating a clock signal 130, 230, 330, 430, 530, 630, 730, 830 of its own. For example, such a clock is produced in the form of a square-wave signal, the frequency of which is on the order of MHz, for example 14.7 MHz, 25 MHz or 100 MHz. Advantageously, a clock signal 130, 230, 330, 430, 530, 630, 730, 830 in a module 1, 2, 3, 4, 5, 6, 7, 8 enables the synchronization of all of the processors (CPU) 10, 11, 20, 21 of said module 1, 2, 3, 4, 5, 6, 7, 8. The distribution of each clock signal 130, 230, 330, 430, 530, 630, 730, 830 to the processors (CPU) 10, 11, 20, 21 of each module 1, 2, 3, 4, 5, 6, 7, 8 is represented here by unidirectional arrows to the left of the elements 130, 230, 330, 430, 530, 630, 730, 830.

According to various embodiments, each clock signal 130, 230, 330, 430, 530, 630, 730, 830 can be transmitted by the interconnection 27 via the XQPI network. Advantageously, each clock signal 130, 230, 330, 430, 530, 630, 730, 830 can be filtered at the input of each module 1, 2, 3, 4, 5, 6, 7, 8 by a phase-locked loop—(PLL) type electronic circuit, capable of eliminating any phase noise introduced by the physical links of the interconnection 27.

The clock signals 130, 230, 330, 430, 530, 630, 730, 830 can be inter-module signals, i.e., passing between different modules 1, 2, 3, 4, 5, 6, 7, 8 [if] a synchronization of said signals proves to be necessary.

To do so, according to various embodiments, during a partitioning step, each FPGA 13, 23, 33, 43, 53, 63, 73, 83 of each module 1, 2, 3, 4, 5, 6, 7, 8 is capable of grouping all of the modules 1, 2, 3, 4, 5, 6, 7, 8 based on common characteristics, for example based on a same operating system (OS) supported by the modules 1, 2, 3, 4, 5, 6, 7, 8, thus forming partitions. Each module 1, 2, 3, 4, 5, 6, 7, 8 therefore belongs to a set or a partition (i.e., a subset) of modules 1, 2, 3, 4, 5, 6, 7, 8 forming the server 100. For example, in FIG. 2, two partitions 40, 50 are created: the first partition 40 is formed of the modules 1, 2, 3, 4, 5, 6, and the second partition 50 is formed of the modules 7, 8.

Each BMC component 14, 24, 34, 44, 54, 64, 74, 84 then compares, in the set or subset (i.e., the partition) to which it belongs, the number of its own module 1, 2, 3, 4, 5, 6, 7, 8 with the numbers of the modules 1, 2, 3, 4, 5, 6, 7, 8 of the same set or subset. As explained previously, the number of a module 1, 2, 3, 4, 5, 6, 7, 8 and of its neighboring modules 1, 2, 3, 4, 5, 6, 7, 8 is identified during a dynamic instantiation step performed by its BMC component 14, 24, 34, 44, 54, 64, 74, 84.

Based on the result of said comparisons, each BMC 14, 24, 34, 44, 54, 64, 74, 84 is capable of identifying whether the module 1, 2, 3, 4, 5, 6, 7, 8 to which it belongs is a master or slave module in the set or subset of modules 1, 2, 3, 4, 5, 6, 7, 8. In one embodiment, the module 1, 2, 3, 4, 5, 6, 7, 8 of the smaller number/identifier (ID) is identified by its BMC 14, 24, 34, 44, 54, 64, 74, 84 as the master module, while the remaining modules are identified as slave modules. However, any other type of identification can be performed, for example the master module can be identified as being the module of the larger number/identifier (ID) or it can be identified based on its address. More generally, the master and slave modules are identified in a same set or subset of modules 1, 2, 3, 4, 5, 6, 7, 8, based on identification information of the modules 1, 2, 3, 4, 5, 6, 7, 8, obtained during their dynamic instantiation.

For the purpose of simplification, the example is now considered in which the smaller-numbered module 1, 2, 3, 4, 5, 6, 7, 8 in a set or subset is identified by each BMC component 14, 24, 34, 44, 54, 64, 74, 84 as the master module, while the remaining modules are identified as slave modules.

According to various embodiments, if the BMC component 14, 24, 34, 44, 54, 64, 74, 84 identifies its module 1, 2, 3, 4, 5, 6, 7, 8 as being a master module, the BMC component 14, 24, 34, 44, 54, 64, 74, 84 configures its FPGA 13, 23, 33, 43, 53, 63, 73, 83 so that said FPGA distributes its clock signal 130, 230, 330, 430, 530, 630, 730, 830 to the other modules 1, 2, 3, 4, 5, 6, 7, 8 of the same set or subset;

slave module, the BMC component 14, 24, 34, 44, 54, 64, 74, 84 configures its FPGA 13, 23, 33, 43, 53, 63, 73, 83 so that said FPGA deactivates the local clock signal 130, 230, 330, 430, 530, 630, 730, 830 of said module 1, 2, 3, 4, 5, 6, 7, 8.

By way of example, in a same set of eight non-partitioned modules 1, 2, 3, 4, 5, 6, 7, 8, the module 1 is identified as the master module and the modules 2, 3, 4, 5, 6, 7, 8 as slave modules. The module 1 then distributes its clock signal 130 to the modules 2, 3, 4, 5, 6, 7, 8, the latter modules having their clock signal 230, 330, 430, 530, 630, 730, 830 deactivated by their FPGA. The distribution of the clock signal 130 and the local deactivation of the clock signals 230, 330, 430, 530, 630, 730, 830 are performed here respectively by the FPGA 13 and the FPGAs 23, 33, 43, 53, 63, 73, 83, which are respectively configured by the BMC component 14 and the BMC components 24, 34, 44, 54, 64, 74, 84. The clock is transmitted by a side-band signal, and thus forms part of the interconnection 28 (i.e., the inter-FPGA interface).

In another example illustrated in FIG. 2:

the module 1 is identified as the master module in the first partition 40, the modules 2, 3, 4, 5, 6 being identified as slave modules in said partition. The module 1 then distributes, by means of its FPGA 13 (unidirectional arrows from said element), its clock signal 130 to the modules 2, 3, 4, 5, 6, the latter modules having locally deactivated via their FPGAs 23, 33, 43, 53, 63 their clock signal 130, 230, 330, 430, 530, 630 (unidirectional arrows in the direction FPGA towards clock signal). Advantageously, the configuration of the FPGA 13 and of the FPGAs 23, 33, 43, 53, 63 is performed respectively by the BMC component 14 and the BMC components 24, 34, 44, 54, 64 (unidirectional arrows in the direction clock signal towards FPGA);

the module 7 is identified as the master module in the second partition 50, the module 8 being identified as a slave module in said partition. The module 7 then distributes, by means of its FPGA 73 (unidirectional arrow from that element), its clock signal 730 to the module 8, the latter module having locally deactivated its clock signal 830 via its FPGA 63 (unidirectional arrow in the direction FPGA towards clock signal). Advantageously, the configuration of the FPGA 73 and of the FPGA 83 is performed respectively by the BMC component 74 and the BMC component 84 (unidirectional arrow in the direction clock signal towards FPGA).

Each processor (CPU) 10, 11, 20, 21 of each module 1, 2, 3, 4, 5, 6, 7, 8 is therefore controlled by a clock signal 130, 230, 330, 430, 530, 630, 730, 830 common to the partition or the set of modules 1, 2, 3, 4, 5, 6, 7, 8 to which it belongs. Advantageously, each processor (CPU) 10, 11, 20, 21 comprises a plurality of registers, each register relating to a thread executed by the processor 10, 11, 20, 21. Said registers are commonly designated by the name time stamp counters (TSC) and are used to synchronize multi-thread tasks, i.e., having a plurality of threads. The time stamp counters (TSC) are initialized by each processor (CPU) 10, 11, 20, 21 after an initialization/reinitialization step (reset), which can occur, for example, during the powering up/restart of a module 1, 2, 3, 4, 5, 6, 7, 8. For the proper execution of the multi-thread tasks, the time stamp counters (TSC) must therefore be perfectly synchronized. Advantageously, the synchronization of the time stamp counters (TSC) is accomplished via the clock signals 130, 230, 330, 430, 530, 630, 730, 830 at the input of the processors (CPU) 10, 11, 20, 21. Such a synchronization is complex to perform, particularly for interconnected modules 1, 2, 3, 4, 5, 6, 7, 8, each comprising a plurality of processors 10, 11, 20, 21, because each processor (CPU) 10, 11, 20, 21 can include initially and locally its own clock signal 130, 230, 330, 430, 530, 630, 730, 830. The time stamp counters (TSC) between each module 1, 2, 3, 4, 5, 6, 7, 8 are therefore potentially incoherent from a temporal point of view and can also drift.

Thus, according to various embodiments, after a possible partitioning step of the modules 1, 2, 3, 4, 5, 6, 7, 8, the synchronization of the time stamp counters (TSC) of the processors (CPU) 10, 11, 20, 21 is accomplished in the following way:

each BMC component 14, 24, 34, 44, 54, 64, 74, 84 of each master module of a set or subset of modules 1, 2, 3, 4, 5, 6, 7, 8 performs a configuration of the FPGA 13, 23, 33, 43, 53, 63, 73, 83 of the master module, in such a way that the routing of any synchronization signal is confined to the slave modules of the same set or subset;

each BMC component 14, 24, 34, 44, 54, 64, 74, 84 of each slave module sends, via the interconnection 28 through the IPMB over LAN network, a message notifying the BMC component 14, 24, 34, 44, 54, 64, 74, 84 of the master module when the slave module leaves an initialization or reinitialization phase (corresponding to an initialization of the time stamp counters [TSC]). The BMC component 14, 24, 34, 44, 54, 64, 74, 84 of the master module can also be informed via a notification of the initialization or reinitialization of its own module 1, 2, 3, 4, 5, 6, 7, 8;

the BMC component 14, 24, 34, 44, 54, 64, 74, 84 of the master module waits for all of the modules 1, 2, 3, 4, 5, 6, 7, 8, including itself, to leave the initialization or reinitialization phase;

when the notifications from all of the modules 1, 2, 3, 4, 5, 6, 7, 8 have been received, the BMC 14, 24, 34, 44, 54, 64, 74, 84 of the master module triggers a reinitialization of all of the time stamp counters (TSC) of the processors (CPU) 10, 11, 20, 21 for all of the modules 1, 2, 3, 4, 5, 6, 7, 8 of the same set or subset to which it belongs, including for its module. Advantageously, said reinitialization is performed by sending a synchronization signal to a physical connection pin that each processor (CPU) 10, 11, 20, 21 of each module 1, 2, 3,

4, 5, 6, 7, 8 has. The sending of such a synchronization signal therefore causes a synchronized reset of all of the time stamp counters (TSC) of the processors (CPU) 10, 11, 20, 21 and thus their temporal coherence, because each processor (CPU) 10, 11, 20, 21 then starts counters (TSC) controlled by the same clock in the set or subset of modules 1, 2, 3, 4, 5, 6, 7, 8.

Moreover, as explained in the description of FIG. 1, each FPGA 13, 23, 33, 43, 53, 63, 73, 83 of each module 1, 2, 3, 4, 5, 6, 7, 8 comprises a data link with each of the processors (CPU) 10, 11, 20, 21 as well as with a communication element 16, 26 such as a BCS2. When a first uncorrected, fatal or catastrophic error occurs at a processor (CPU) 10, 11, 20, 21 or a communication element 16, 26 of a module 1, 2, 3, 4, 5, 6, 7, 8, said error can be propagated at very high speed, generally in a few microseconds, via the interconnection 27 through the XQPI network to the other modules 1, 2, 3, 4, 5, 6, 7, 8 of the same set or subset, causing errors at their processors (CPU) 10, 11, 20, 21 and their communication elements 16, 26. In a multi-module context, therefore, it is necessary to be able to find the first error in order to diagnose the breakdown. More generally, it is also necessary to be able to precisely identify (e.g., locate, time stamp) any occurrence of an error in a module 1, 2, 3, 4, 5, 6, 7, 8.

Thus, according to various embodiments, a time stamp counter (TSC) is also used for each FPGA 13, 23, 33, 43, 53, 63, 73, 83, said TSC being created by a register of configurable size, for example of forty bits, and synchronized via the clock signal 130, 230, 330, 430, 530, 630, 730, 830 of the master module of the set or subset of modules 1, 2, 3, 4, 5, 6, 7, 8 to which the FPGA 13, 23, 33, 43, 53, 63, 73, 83 belongs, for example at a frequency of 25 MHz. Each of the FPGAs 13, 23, 33, 43, 53, 63, 73, 83 has a time stamp counter (TSC) perfectly synchronized with those of the FPGAs 13, 23, 33, 43, 53, 63, 73, 83 of the same set or subset of modules 1, 2, 3, 4, 5, 6, 7, 8. Advantageously, due to said synchronous time reference, each FPGA 13, 23, 33, 43, 53, 63, 73, 83 is capable of time stamping and recording a report concerning an error or any event that takes place in its module 1, 2, 3, 4, 5, 6, 7, 8. It will therefore be possible at any time to unambiguously recreate the chronology of multiple errors or events in their respective order. To do so, following the time stamping by the FPGAs 13, 23, 33, 43, 53, 63, 73, 83 of events, for example errors propagated in each module 1, 2, 3, 4, 5, 6, 7, 8, all of the BMC components 14, 24, 34, 44, 54, 64, 74, 84 are capable of exchanging and sharing information related to said events, thus enabling the source of said errors to be found, i.e., the first error. The location and precise diagnosis of a faulty module 1, 2, 3, 4, 5, 6, 7, 8 are therefore facilitated.

According to various embodiments, after a possible partitioning step of the modules 1, 2, 3, 4, 5, 6, 7, 8, the synchronization of the time stamp counters (TSC) of the FPGAs 13, 23, 33, 43, 53, 63, 73, 83, as well as the detection of a first error, is accomplished in the following way:

each BMC component 14, 24, 34, 44, 54, 64, 74, 84 of each master module of a set or subset of modules 1, 2, 3, 4, 5, 6, 7, 8 performs a configuration of the FPGA 13, 23, 33, 43, 53, 63, 73, 83 of the master module, in such a way that the routing of any synchronization signal is confined to the slave modules of the same set or subset;

each BMC component 14, 24, 34, 44, 54, 64, 74, 84 of each slave module sends, via the interconnection 28 through the IPMB over LAN network, a message notifying the BMC component 14, 24, 34, 44, 54, 64, 74, 84 of the master module when the slave module leaves an initialization or reinitialization phase (corresponding to an initialization of the time stamp counters [TSC]). The BMC component 14, 24, 34, 44, 54, 64, 74, 84 of the master module can also be informed via notification of the initialization or reinitialization from its own module 1, 2, 3, 4, 5, 6, 7, 8;

the BMC component 14, 24, 34, 44, 54, 64, 74, 84 of the master module waits until all of the modules 1, 2, 3, 4, 5, 6, 7, 8, including itself, have left the initialization or reinitialization phase;

when the notifications from all the modules 1, 2, 3, 4, 5, 6, 7, 8 have been received, the BMC 14, 24, 34, 44, 54, 64, 74, 84 of the master module triggers a reinitialization of all of the time stamp counters (TSC) of the FPGAs 13, 23, 33, 43, 53, 63, 73, 83 of all of the modules 1, 2, 3, 4, 5, 6, 7, 8 of the same set or subset to which it belongs, including itself. The time stamp counters of the different FPGAs 13, 23, 33, 43, 53, 63, 73, 83 are then perfectly synchronized;

whenever an error (or an event) occurs in the module 1, 2, 3, 4, 5, 6, 7, 8, for example at a processor (CPU) 10, 11, 20, 21 or a communication element 16, 26 (e.g., a BCS2), the FPGA 13, 23, 33, 43, 53, 63, 73, 83 of said module 1, 2, 3, 4, 5, 6, 7, 8 stores information related to the error via its time stamp counter (TSC). Examples of information related to the error include its type (e.g., uncorrected, fatal), its source (e.g., module number, type of component concerned: CPU or BCS), as well as its time stamp;

each BMC component 14, 24, 34, 44, 54, 64, 74, 84 of each module 1, 2, 3, 4, 5, 6, 7, 8 then accesses the information stored by the time stamp counter (TSC) in the FPGA 1, 2, 3, 4, 5, 6, 7, 8 and makes this information accessible in an appropriate way to any administrator of the server 100 or external tool allowing the management of the server 100. For example, each BMC component 14, 24, 34, 44, 54, 64, 74, 84 communicates the information read in the FPGA 1, 2, 3, 4, 5, 6, 7, 8 via a log file accessible from an external hardware management application;

a step of comparing the information, for example between the time stamp, the source, the type of each error, that is communicated by each BMC component 14, 24, 34, 44, 54, 64, 74, 84 then makes it possible to identify a first error among a set of errors that occurred in different modules 1, 2, 3, 4, 5, 6, 7, 8, as well as the chronology of the subsequent errors. Said comparison step can, for example, be automated or carried out directly by the administrator of the server 100. Advantageously, the identification, for example the determination of the chronology and location, of the first error then makes it possible to decide on one or more actions to take on the server 100, for example restarting a specific module 1, 2, 3, 4, 5, 6, 7, 8, or reconfiguring a partition if a module 1, 2, 3, 4, 5, 6, 7, 8 therein is failing.

Advantageously, the embodiments previously described enable the software compatibility with standard management interfaces, for example interfaces in accordance with the IPMI standard, irrespective of the number of modules 1, 2, 3, 4, 5, 6, 7, 8 comprising the server 100. In particular, this is made possible due to:

the BMC components 14, 24, 34, 44, 54, 64, 74, 84, each of which is usable as a data communication interface, enabling in particular the synchronization of the clocks, time stamp counters (TSC), as well as management of the high-level functions, i.e., the central functions, of the different modules 1, 2, 3, 4, 5, 6, 7, 8;

the SMC components 15, 25 responsible for managing the low-level functions, i.e., the local functions of their own modules 1, 2, 3, 4, 5, 6, 7, 8, for example measuring their physical parameters and their powering up. In this way, great flexibility is obtained in terms of hardware and software architecture, thus facilitating any possible future need for modification, adaptation or evolution of the server 100.

Advantageously, the embodiments previously described enable the management of a set or subset of modules 1, 2, 3, 4, 5, 6, 7, 8 as a result of the partitioning of said modules, as well as their respective clock signals 230, 330, 430, 530, 630, 730, 830. The management of a set or subset of modules 1, 2, 3, 4, 5, 6, 7, 8 is particularly advantageous, because it enables the support of different OS according to the modules 1, 2, 3, 4, 5, 6, 7, 8, the identification, order and precise location of any possible error for diagnostic purposes, as well as a possible dynamic reconfiguration of the partitions, particularly in the event of failure of a module 1, 2, 3, 4, 5, 6, 7, 8.

Another advantage of the proposed embodiments is in the hardware realization of the server 100, and particularly the way in which the interconnection unit 30 and the modules 1, 2, 3, 4, 5, 6, 7, 8 are interconnected and electrically supplied allows the hot maintenance of each element of the server 100 as well as improved resiliency.

Moreover, the embodiments previously described for a server 100 can also be transposed to any computer equipment or infrastructure comprising a plurality of modules 1, 2, 3, for example a supercomputer.

The invention claimed is:

1. A server (100) comprising a plurality of modules (1-8), each module (1-8) comprising:
   a communication element (16, 26) capable of ensuring the coherence of a memory shared among the modules (1-8);
   a plurality of processors (CPU) (10, 11, 20, 21) connected to each other and connected to the communication element (16, 26);
   a system on a chip (SOC) (12, 22) connected to the plurality of processors (CPU) (10, 11, 20, 21) and to the communication element (16, 26), the system on a chip (SOC) (12, 22) executing firmware;
   a network of programmable ports (FPGA) (13, 23, 33, 43, 53, 63, 73, 83) connected to the system on a chip (SOC) (12, 22), to the communication element (16, 26) and to the plurality of processors (CPU) (10, 11, 20, 21);
   the modules (1-8) being interconnected by:
   an interconnection (27) between each communication element (16, 26) via an XQPI network;
   an interconnection (28) between each system on a chip (SOC) (12, 22) via an Ethernet protocol private network, encapsulating a communication protocol in accordance with the IPMB standard;
   the firmware executed on each system on a chip (SOC) (12, 22) of each module (1-8) producing two software components, namely:
   a satellite management controller (SMC) component of the system (15, 25) capable of measuring the physical parameters of its module (1-8) and managing the local functions of said module (1-8);
   a baseboard management controller (BMC) component (14, 24, 34, 44, 54, 64, 74, 84) capable of supervising all of the SMCs (15, 25) of all of the modules (1-8), providing central management of all functions of the server (100) and exchanging data with each of the BMC components (14, 24, 34, 44, 54, 64, 74, 84) via the interconnection (28) between each system on a chip (SOC) (12, 22).

2. The server (100) according to claim 1, wherein the interconnection (27) of the communication elements (16, 26) and
   interconnection (28) of the SOCs (12, 22) are accomplished by means of an interconnection unit (30), the interconnection unit (30) comprising a network of programmable ports (FPGA).

3. The server (100) according to claim 2, wherein the interconnection unit (30) is electrically powered by the modules (1-8), each module (1-8) comprising at least two power supply units (PSU) dimensioned with a redundancy of 2N.

4. The server (100) according to claim 1, wherein one of the functions managed by each BMC component (14, 24, 34, 44, 54, 64, 74, 84) is a function enabling the instantiation of the modules (1-8), said function being performed in the following manner:
   the sending of an identifier (ID) request by the FPGA (13, 23, 33, 43, 53, 63, 73, 83) of each module (1-8) to the interconnection unit (30) by means of the system on a chip (SOC) (12, 22);
   the sending by the FPGA of the interconnection unit (30) of a unique identifier (ID) to the FPGA (13, 23, 33, 43, 53, 63, 73, 83) in response to the identifier request;
   the determination by the BMC component (14, 24, 34, 44, 54, 64, 74, 84) of the address of its module (1-8) and of the addresses of the modules (1-8) to which it is interconnected, the determination of said addresses being performed based on the identifier (ID) received by the FPGA (13, 23, 33, 43, 53, 63, 73, 83).

5. The server (100) according to claim 4, wherein the identifier (ID) sent by the FPGA of the interconnection unit (30) is determined based on each physical connection location of each of the modules (1-8) to the interconnection module (30).

6. The server (100) according to claim 1, wherein each of the modules (1-8) comprises
   a clock signal generator (130, 230, 330, 430, 530, 630, 730, 830) capable of synchronizing the processors (CPU) (10, 11, 20, 21) of its module (1-8);
   its FPGA (13, 23, 33, 43, 53, 63, 73, 83) programmed to partition and group the modules into subsets (1-8) based on common characteristics.

7. The server (100) according to claim 6, wherein each BMC component (14, 24, 34, 44, 54, 64, 74, 84) is programmed to:
   identify in a set or subset of modules (1-8) whether it belongs to a master or slave module, based on identification information from each of the modules (1-8) of said set or subset;
   if it belongs to a master module, configure its FPGA (13, 23, 33, 43, 53, 63, 73, 83) in such a way that the FPGA (13, 23, 33, 43, 53, 63, 73, 83) distributes the clock signal (130, 230, 330, 430, 530, 630, 730, 830) from the master module to the slave modules of the same set or subset;
   if it belongs to a slave module, configure its FPGA (13, 23, 33, 43, 53, 63, 73, 83) in such a way that the FPGA (13, 23, 33, 43, 53, 63, 73, 83) deactivates the clock signal (130, 230, 330, 430, 530, 630, 730, 830) from the slave module.

8. The server (100) according to claim 7, wherein each processor (CPU) (10, 11, 20, 21) of each module (1-8)

comprises time stamp counters (TSC) capable of synchronizing tasks involving a plurality of threads, the synchronization of all of the time stamp counters (TSC) of said processors (CPU) (10, 11, 20, 21) in a set or subset of modules (1-8) being accomplished by:

the sending of a notification, by each BMC component (14, 24, 34, 44, 54, 64, 74, 84) of each slave module of said set or subset, to the BMC (14, 24, 34, 44, 54, 64, 74, 84) of the master module when the slave module leaves an initialization or reinitialization phase;

a notification to the BMC (14, 24, 34, 44, 54, 64, 74, 84) of the master module when the master module leaves an initialization or reinitialization phase;

the sending by the BMC (14, 24, 34, 44, 54, 64, 74, 84) of the master module, when all of the master and slave modules have left an initialization or reinitialization phase, of a synchronization signal capable of reinitializing all of the time stamp counters (TSC) of the processors (CPU) (10, 11, 20, 21) for all the modules (1-8) of the set or subset.

9. The server (100) according to claim 7, wherein each FPGA (13, 23, 33, 43, 53, 63, 73, 83) of each module (1-8) comprises time stamp counters (TSC) capable, whenever an error occurs in its module (1-8), of recording information related to the error, comprising at least the time stamp of the error, the synchronization of all of the time stamp counters (TSC) of each FPGA (13, 23, 33, 43, 53, 63, 73, 83) in a module (1-8) set or subset being accomplished by the sending of a notification, by each BMC component (14, 24, 34, 44, 54, 64, 74, 84) of each slave module of said set or subset, to the BMC (14, 24, 34, 44, 54, 64, 74, 84) of the master module when the slave module leaves an initialization or reinitialization phase;

a notification to the BMC (14, 24, 34, 44, 54, 64, 74, 84) of the master module when the master module leaves an initialization or reinitialization phase;

the sending by the BMC (14, 24, 34, 44, 54, 64, 74, 84) of the master module, when all of the master and slave modules have left an initialization or reinitialization phase, of a synchronization signal capable of reinitializing all of the time stamp counters (TSC) of the FPGAs (13, 23, 33, 43, 53, 63, 73, 83) for all modules (1-8) of the same set or subset.

10. The server (100) according to claim 9, wherein the identification of an error in a set or subset of modules (1-8) is performed by a step of comparison between the error information recorded by all of the time stamp counters (TSC) of the FPGAs (13, 23, 33, 43, 53, 63, 73, 83) of said set or subset, the BMCs (14, 24, 34, 44, 54, 64, 74, 84) being capable of exchanging and sharing the error information in the same set or subset of modules (1-8).

* * * * *